March 6, 1962 C. DUDZIAK 3,024,424
GAIN CONTROL
Filed Oct. 1, 1959
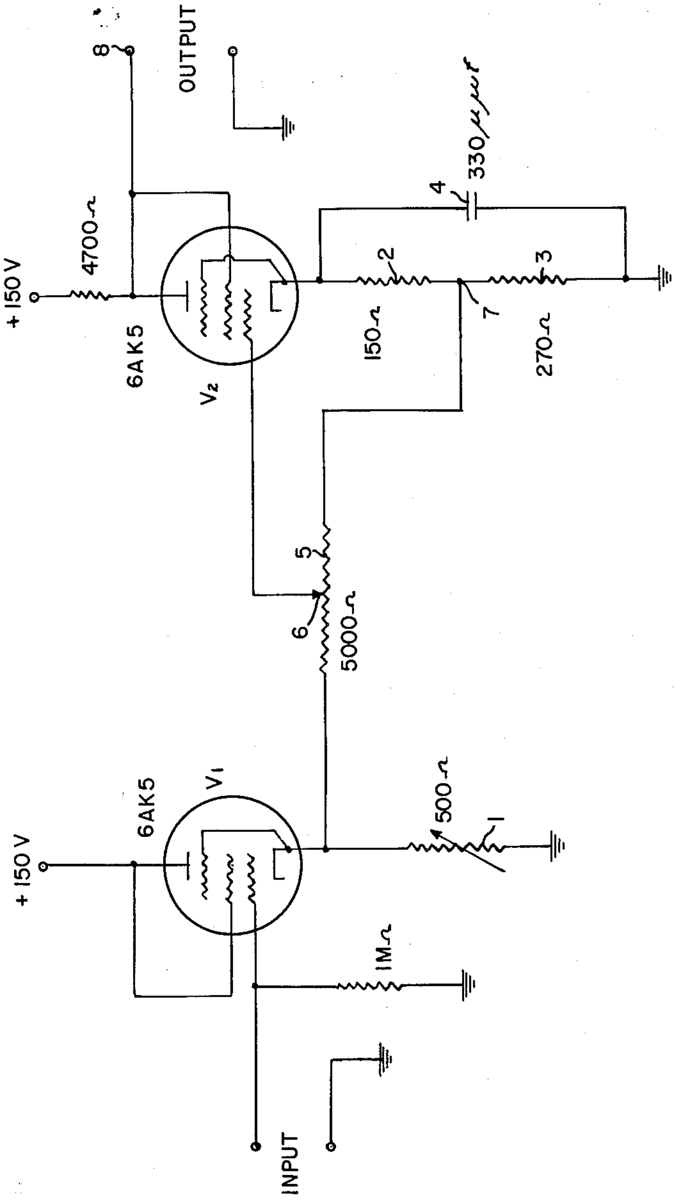
INVENTOR.
CHESTER DUDZIAK
BY Wade Koontz
ATTORNEY
and James S. Shannon
AGENT 3,024,424
Patented Mar. 6, 1962

3,024,424
GAIN CONTROL

Chester Dudziak, Riverton, N.J., assignor to the United States of America as represented by the Secretary of the Air Force Filed Oct. 1, 1959, Ser. No. 843,899
1 Claim. (Cl. 330—173)

In wide band amplifiers direct coupling is frequently employed to avoid the affect of coupling capacitors on the frequency response. The use of a gain control potentiometer in a direct coupled amplifier, however, causes the bias of the grid connected to the potentiometer to vary with changes in the potentiometer setting. This results in a direct current shift in the amplifier that is undesirable in certain applications, such as when the amplifier is used in the deflection circuits of a cathode ray tube. It is the purpose of this invention to provide a circuit arrangement that permits the use of a gain control potentiometer in a direct coupled amplifier without the undesired direct current shift.

The invention will be explained in detail with reference to the specific embodiment thereof shown in the single FIGURE of the accompanying drawing.

Referring to the drawing, the input signal to be amplified is applied between the control grid of tube $V_1$ and ground and the amplified output signal appears between the anode of tube $V_2$ and ground. Stage $V_1$ is operated as a cathode follower with its output impedance, the variable resistor 1, connected between its cathode and ground. $V_2$ is operated as a conventional self biased amplifier stage, the bias being furnished by resistor 2 connected in series with resistor 3 between cathode and ground and by-passed for the signal by condenser 4.

The signal is conveyed from the output of cathode follower stage $V_1$ to the input of amplifier stage $V_2$ by means of a gain control potentiometer 5 having an adjustable tap 6. The high signal potential end of potentiometer resistor 5 is connected to the cathode of $V_1$ and the low signal potential end to point 7 between resistor 2 and 3. The adjustable tap 6 is connected to the control grid of $V_2$. The output signal of $V_1$ appears between the cathode of this tube and ground, and, since the impedance between point 7 and ground is small relative to the impedance of resistor 5, substantially all of the output signal appears across resistor 5. Therefore, by adjustment of the position of tap 6, any desired fraction of this signal may be applied between the control grid and cathode of $V_2$.

In order to prevent the adjustment of tap 6 for gain control purposes from changing the direct potential, or bias, of the control grid of $V_2$ relative to its cathode with a resulting undesirable shift in the direct potential of output terminal 8, both ends of potentiometer resistor 5, in accordance with the invention, are made to have the same direct potential. This is accomplished by adjusting the value of variable resistance 1 until the direct potential of the cathode of $V_1$ exactly equals the direct potential of point 7. When this condition is established there is no direct current flow in resistor 5 so that the direct potential of the control grid of $V_2$ and the direct potential of output terminal 8 are independent of the position of tap 6, as desired.

I claim:

A direct coupled variable gain amplifier comprising first and second amplifier tubes each having at least an anode, a cathode and a control grid, means for applying an input signal between the control grid of said first tube and a point of reference potential, means for maintaining the anode of said first tube at a fixed positive potential relative to said point of reference potential, a first resistance connected between the cathode of said first tube and said point of reference potential, a load resistance connected between the anode of said second tube and a point having a positive potential relative to said point of reference potential, means for connecting an output circuit between the anode of said second tube and said point of reference potential, a second resistance connected between the cathode of said second tube and said point of reference potential, an adjustable potentiometer consisting of a two-terminal resistance element and an adjustable tap thereon, a direct current connection between the control grid of said second tube and said tap, a direct current connection between one terminal of said resistance element and an intermediate point on said second resistance, a direct current connection between the other terminal of said resistance element and the cathode of said first tube, said first resistance being adjusted to such value that the direct potential of the cathode of said first tube equals the direct potential of the said intermediate point on said second resistance whereby the direct current flow through said potentiometer resistance element is zero and the direct potential of the grid of said second tube relative to its cathode is independent of the position of said potentiometer tap.

References Cited in the file of this patent

UNITED STATES PATENTS

| | | |
|---|---|---|
| 2,161,844 | Babler | June 13, 1939 |
| 2,545,244 | Smith | Mar. 13, 1951 |
| 2,839,618 | Heacock | June 17, 1958 |
| 2,890,294 | Cooper | June 9, 1959 |

FOREIGN PATENTS

| | | |
|---|---|---|
| 1,123,516 | France | June 11, 1956 |